United States Patent
Hayes et al.

(10) Patent No.: US 7,347,488 B2
(45) Date of Patent: Mar. 25, 2008

(54) VEHICLE CAB INCLUDING CENTRALLY-LOCATED "A POST"

(75) Inventors: Aaron R. Hayes, Emden, IL (US); Daniel J. Whiting, Normal, IL (US); Christopher D. Derham, Galesburg, IL (US); Brad R. Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 11/214,904

(22) Filed: Aug. 31, 2005

(65) Prior Publication Data

US 2007/0046070 A1    Mar. 1, 2007

(51) Int. Cl.
    *B60R 27/00*    (2006.01)
(52) U.S. Cl. .............................. 296/190.08; 296/190.1
(58) Field of Classification Search ........... 296/190.08, 296/190.1, 190.11
    See application file for complete search history.

(56) References Cited

U.S. PATENT DOCUMENTS

| | | | |
|---|---|---|---|
| D131,591 S | 3/1942 | Keller | |
| 2,464,696 A | 3/1949 | Lelong | |
| 3,158,395 A | 11/1964 | Smith | |
| 3,802,530 A | 4/1974 | Purcell et al. | |
| 3,866,969 A | 2/1975 | Sandrock et al. | |
| D242,816 S | 12/1976 | Maurer | |
| RE29,123 E | 1/1977 | Malm et al. | |
| 4,007,958 A | 2/1977 | Peifer et al. | |
| 4,062,582 A | 12/1977 | Youmans | |
| D259,045 S | 4/1981 | Mende | |
| 4,605,259 A | 8/1986 | Hurlburt | |
| 4,652,043 A | 3/1987 | Hurlburt | |
| 5,413,188 A | 5/1995 | Ui | |
| 5,584,346 A | 12/1996 | Sakamoto et al. | |
| 5,636,867 A | 6/1997 | McNabb et al. | |
| 5,906,411 A | 5/1999 | Stauffer et al. | |
| 6,148,688 A | 11/2000 | Nishimaki | |
| 6,149,228 A | 11/2000 | O'Neill et al. | |
| 6,189,954 B1 | 2/2001 | Martin, Jr. | |
| 6,276,749 B1 | 8/2001 | Okazawa et al. | |
| 6,523,617 B2 | 2/2003 | McGugan | |
| 6,755,270 B2 | 6/2004 | Saarinen | |
| 2002/0121397 A1 | 9/2002 | Saarinen | |
| 2004/0163865 A1 | 8/2004 | Shimokakiuchi et al. | |

FOREIGN PATENT DOCUMENTS

| | | |
|---|---|---|
| EP | 0422489 | 4/1991 |
| EP | 0 608 422 A1 | 8/1994 |
| EP | 0608422 | 8/1994 |
| EP | 1001094 | 5/2000 |
| EP | 1 380 497 A2 | 1/2004 |
| EP | 1449966 | 8/2004 |

*Primary Examiner*—Lori L. Lyjak
(74) *Attorney, Agent, or Firm*—Finnegan, Henderson, Farabow, Garrett & Dunner

(57) ABSTRACT

A vehicle cab includes a floor, a roof, a front support operably coupling the floor and the roof, and at least two side supports operably coupling the floor and the roof. The vehicle cab further includes a door operably coupled to one of the at least two side supports. The door extends from adjacent the floor toward the roof. The door includes a window extending in a substantially uninterrupted manner from a lower edge of the door toward an upper edge of the door. The front support is located along a centrally-located, longitudinal axis of the vehicle cab, such that when the door is in a closed position, the door extends along a line oriented at an angle oblique with respect the longitudinal axis of the vehicle cab between the front support and the side support.

22 Claims, 5 Drawing Sheets

VEHICLE CAB INCLUDING CENTRALLY-LOCATED "A POST"

TECHNICAL FIELD

The present disclosure relates generally to a vehicle cab and, more particularly, to a vehicle cab including a centrally-located "A post."

BACKGROUND

A vehicle cab may serve several purposes. For example, in vehicles such as work machines, for example, wheel-loaders, front-end loaders, bulldozers, and excavators, it may be desirable for a vehicle cab to provide a vehicle operator with protection from the elements and/or from injury due to collisions or accidents. A vehicle cab may also serve to provide a vehicle operator with a comfortable environment in which to operate the vehicle. In addition, it may often be desirable for a vehicle cab to provide such protections without unduly hindering the vehicle operator's visibility. Furthermore, it may be desirable for the vehicle cab to not unduly limit access to vehicle components, for example, so that such vehicle components may be inspected and/or serviced.

One example of a tractor cab is described in U.S. Reissue Pat. No. 29,123 (the '123 patent) issued to Malm et al. on Jan. 25, 1977. The '123 patent describes a tractor cab and control console that are vibration-isolated from a tractor chassis by securing the tractor cab to the tractor chassis by resilient mount assemblies, which provide vibration isolation. The '123 patent's tractor cab is removable from the tractor chassis, and during assembly of the tractor, the control console may be mounted to the tractor chassis prior to adding the tractor cab to the tractor chassis.

Although the tractor cab of the '123 patent may provide some vibration isolation from the tractor chassis and may be removable from the tractor chassis, the '123 patent's tractor cab may not provide adequate visibility, operator protection, and/or ease of access to other vehicle components.

The disclosed vehicle cab may be directed to overcoming one or more of the desires set forth above.

SUMMARY OF THE INVENTION

In one aspect, the present disclosure includes a vehicle cab including a floor, a roof, a front support operably coupling the floor and the roof, and at least two side supports operably coupling the floor and the roof. The vehicle cab further includes a door operably coupled to one of the at least two side supports. The door extends from adjacent the floor toward the roof and is configured to move between an open position and a closed position in which the door is operably coupled adjacent the front support. The door includes a window extending in a substantially uninterrupted manner from a lower edge of the door toward an upper edge of the door. The front support is located along a centrally-located, longitudinal axis of the vehicle cab, such that when the door is in the closed position, the door extends along a line oriented at an angle oblique with respect the longitudinal axis of the vehicle cab between the front support and the side support.

In a further aspect, the present disclosure includes a work machine including a frame defining a longitudinal axis and a power source operably coupled to the frame. The power source is configured to supply power to the work machine. The work machine further includes a pair of ground engaging members operably coupled to the frame. The ground engaging members are configured to propel the work machine via power supplied by the power source. The work machine also includes a vehicle cab operably coupled to the work machine. The vehicle cab includes a floor, a roof, a front support operably coupling the floor and the roof, and at least two side supports operably coupling the floor and the roof. The vehicle cab further includes a door operably coupled to one of the at least two side supports. The door extends from adjacent the floor toward the roof and is configured to move between an open position and a closed position in which the door is operably coupled adjacent the front support. The door includes a window extending in a substantially uninterrupted manner from a lower edge of the door toward an upper edge of the door. The front support is located along a centrally-located, longitudinal axis of the vehicle cab, such that when the door is in the closed position, the door extends along a line oriented at an angle oblique with respect the longitudinal axis of the vehicle cab between the front support and the side support.

According to yet a further aspect, a method for enhancing an operator's visibility from a vehicle cab of a vehicle includes providing a vehicle cab, including a front support and two windows extending obliquely from adjacent the front support toward a rear end of the vehicle. The method further includes aligning the front support of the vehicle cab with at least one of an actuator, an exhaust stack, and a pre-cleaner operably coupled to the vehicle. The method further includes positioning an operator's seat within the vehicle cab such that when the operator of the vehicle is in the operator's seat, the operator can view a lateral extent of a front portion of the vehicle adjacent the ground.

DETAILED DESCRIPTION

Figure 1:
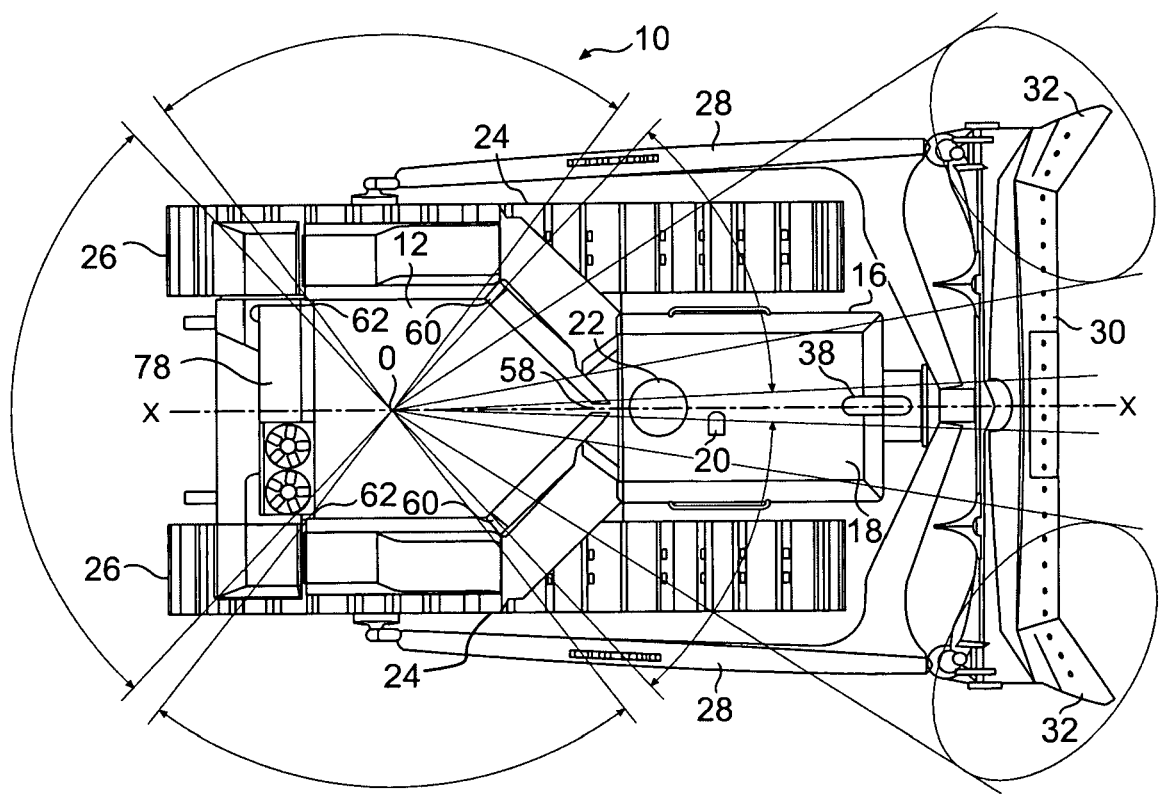
FIG. 1 is a plan view of an exemplary embodiment of a vehicle cab mounted on a vehicle.

FIG. 1 illustrates an exemplary vehicle such as a work machine 10 that includes an exemplary embodiment of a vehicle cab 12. Although the exemplary work machine 10 depicted in FIG. 1 is a track-type tractor, work machine 10 may be a track-type loader, a hydraulic excavator, a mining truck, a wheel loader, or another work machine known to those having skill in the art. Further, although the exemplary vehicle has been depicted as work machine 10, exemplary vehicle cab 12 may be used with other vehicle types.

Work machine 10 may include a power source 16, which may be enclosed by a power source cover 18. Power source 16 may be configured to provide power to propel work machine 10 and/or to power various systems of work machine 10. Power source 16 may include an exhaust stack 20 and/or a power source pre-cleaner 22, which may extend through apertures provided in power source cover 18.

Exhaust stack 20 and power source pre-cleaner 22 may be located in alignment with, for example, a longitudinal axis X (e.g., a centrally-located, longitudinal axis) of work machine 10.

Work machine 10 may include an undercarriage 24 carrying ground engaging members (e.g., two ground engaging tracks 26) located on opposite sides of work machine 10, which are configured to engage the ground and to propel work machine 10. Undercarriage 24 may be configured to support two push arms 28 located on opposite sides of work machine 10. Two push arms 28 may be connected at one end to a work implement 30 such as, for example, a blade of a bulldozer configured to push and/or pull dirt. Work implement 30 may include lower, outer portions 32 located on either side of work implement 30, which define a lower, lateral extent of work implement 30. The other end of push arms 28 may be connected to undercarriage 24.

Work machine 10 may further include a lift cylinder 38 located in the vicinity of the front end of work machine 10. Lift cylinder 38 may be connected to work implement 30. For example, lift cylinder 38 may be located in alignment with longitudinal axis X (e.g., a centrally-located longitudinal axis) of work machine 10. Lift cylinder 38 may include a hydraulic actuator configured to extend and retract in response to operator commands, such that work implement 30 may be raised and lowered relative to the ground via pivoting of push arms 28 relative to undercarriage 24.

Work machine 10 may further include a second work implement 42 (see, e.g., FIG. 3) located at the rear end of work machine 10. For example, second work implement 42 may be a ripper configured to penetrate and loosen hard surfaces. Second work implement 42 may be operably coupled to one or more cylinders 44 configured to pivot second work implement 42 in and out of an operational position.

Figure 2:
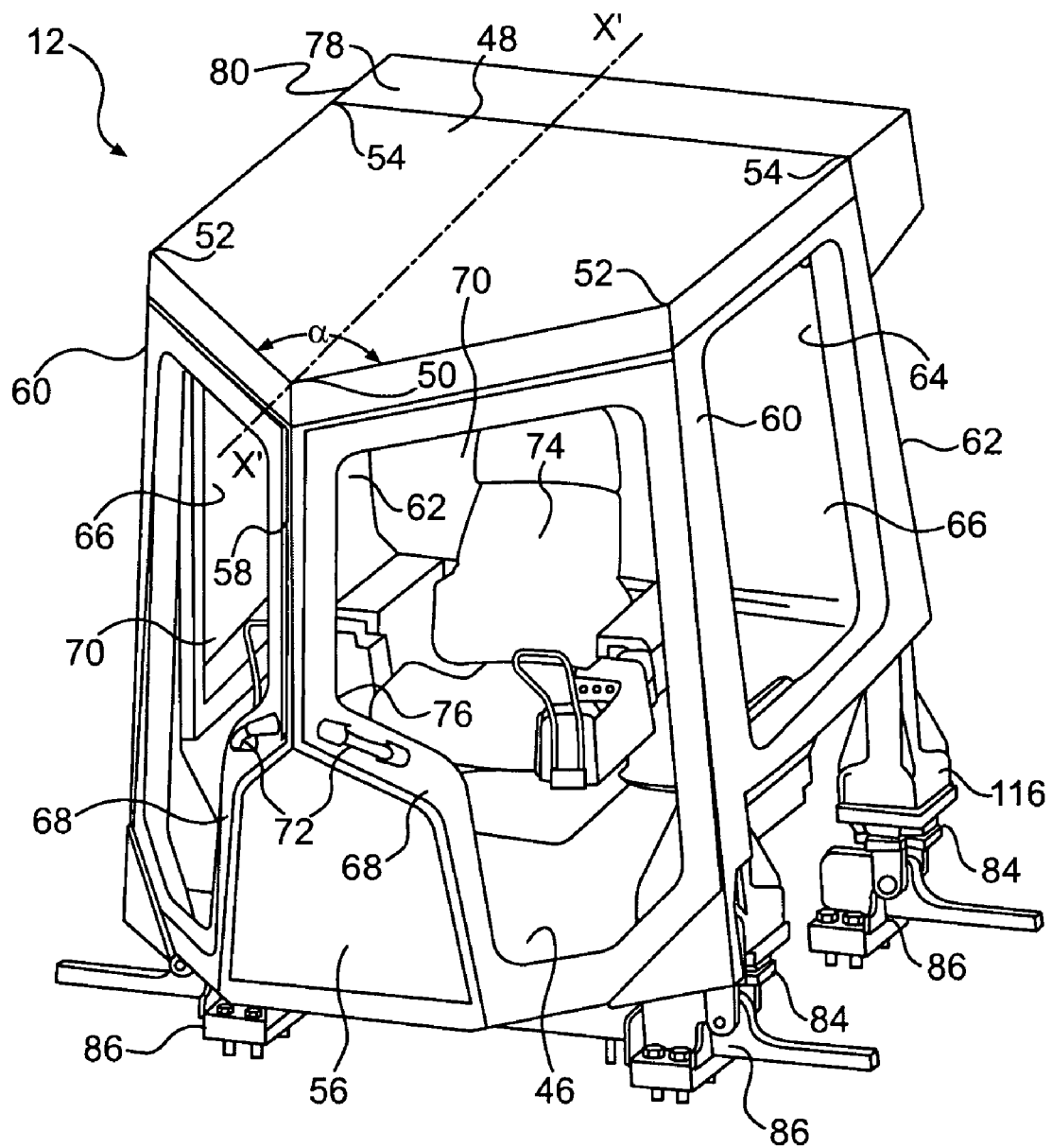
FIG. 2 is a diagrammatic perspective view of an exemplary embodiment of a vehicle cab.

Referring to FIG. 2, exemplary vehicle cab 12 may include a floor 46 and a roof 48, which may be substantially pentagonal-shaped. For example, roof 48 may define a front, center corner 50 located in alignment with a longitudinal axis X' (e.g., a centrally-located, longitudinal axis) of vehicle cab 12, which may, in turn, be in substantial in alignment with longitudinal axis X of work machine 10. Vehicle cab 12 may further include two forward, side corners 52 located substantially opposite to one another on either side of vehicle cab 12, and two rear, side corners 54 located substantially opposite to one another on either side of the rear end of vehicle cab 12. Front, center corner 50 and two forward, side corners 52 may define an enclosed angle $\alpha$ ranging from about 60 degrees to about 120 degrees. For example, angle $\alpha$ may be about 90 degrees.

Vehicle cab 12 may further include a front portion 56 extending upward from floor 46. Front portion 56 may be configured to define a recess for providing clearance for power source cover 18. Vehicle cab 12 may further include an "A post" 58 extending between an upper end of front portion 56 and front, center corner 50 of roof 48. Vehicle cab 12 may further include a pair of "B posts" 60 located substantially opposite to one another on either side of vehicle cab 12. "B posts" 60 may extend from adjacent floor 46 to forward, side corners 52 of roof 48. Vehicle cab 12 may further include a pair of "C posts" 62 located substantially opposite to one another on either side of the rear end of vehicle cab 12. "C posts" 62 may extend from adjacent floor 46 to two rear, side corners 54 of roof 48. By virtue of such an arrangement, floor 46 and roof 48 may be in a substantially fixed relationship. "A post" 58, "B posts" 60, and/or "C posts" 62 may include, for example, integrated reinforcement, for example, such that they provide protection for an operator located in vehicle cab 12 in the event objects, such as trees or rocks fall onto vehicle cab 12, and/or in the event work machine 10 rolls over onto its side or roof 48.

Vehicle cab 12 may include a rear window 64 located between "C posts" 62 and the rear ends of floor 46 and roof 48. Further, vehicle cab 12 may include a pair of side windows 66 located between "B posts" 60, "C posts" 62, floor 46, and roof 48. Vehicle cab 12 may further include a pair of doors 68, each located on either side of "A post" 58 and between "A post" 58, a respective one of "B posts" 60, floor 46, and roof 48. Each of doors 68 may include a window 70 extending substantially from "A post" 58 to "B post" 60, and extending substantially from a lower edge of door 68 to an upper edge of door 68. For example, windows 70 may extend substantially from floor 46 to roof 48 (e.g., in a substantially uninterrupted manner, for example, such that no cross members obstruct an operator's view through windows 70). Doors 68 may be hingedly secured to vehicle cab 12 along "B posts" 60, for example, such that doors 68 may swing from a closed position to an open position without being obstructed, for example, by power source cover 18. Doors 68 may each include a door handle 72 configured to assist an operator when unlatching and/or moving doors 68 to an open position from a closed position and to the closed position from the open position.

Figure 4:
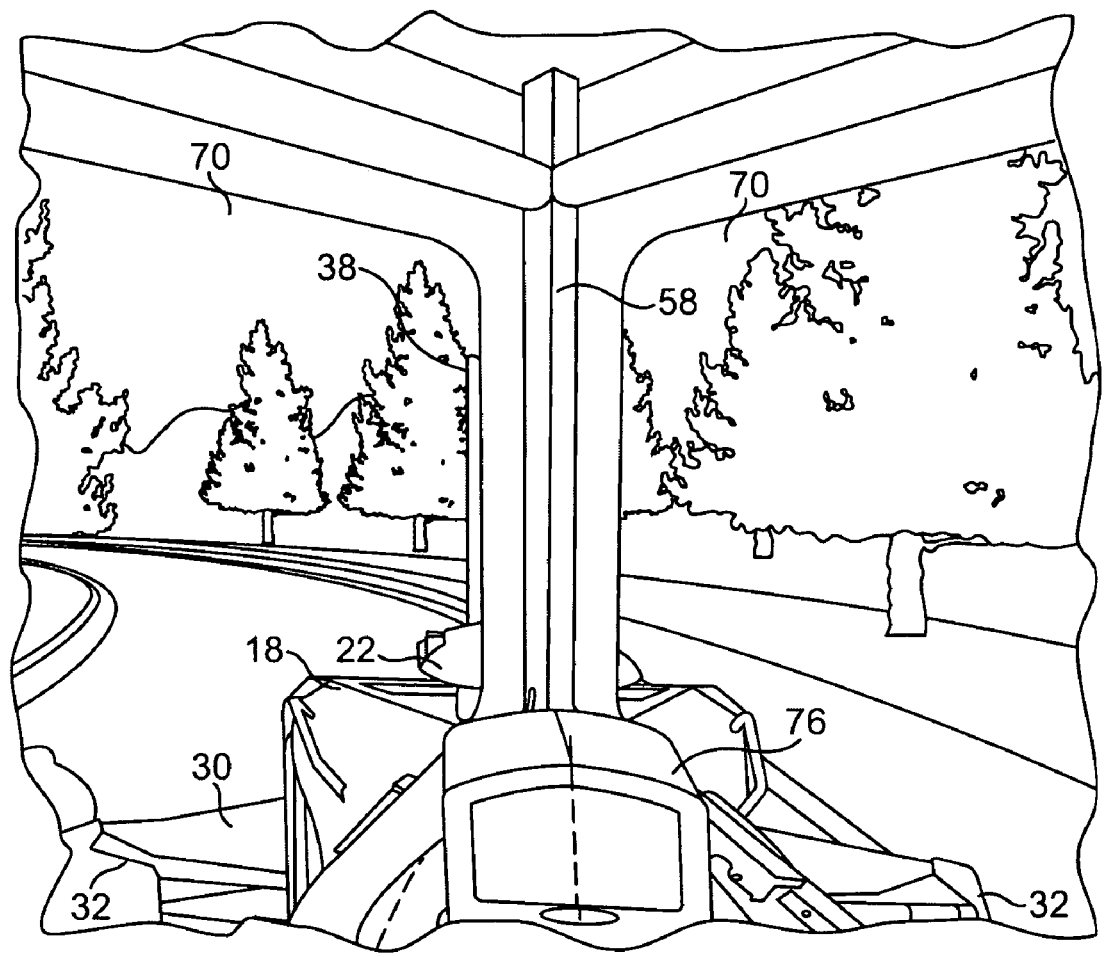
FIG. 4 is a diagrammatic representation of a view from within an exemplary embodiment of a vehicle cab.

Vehicle cab 12 may define an interior space configured to provide protection for an operator seat 74 and a console 76 (see, e.g., FIG. 4). Operator seat 74 may be configured to swivel so that, for example, an operator is able to more easily obtain a 360 degree range of views from vehicle cab 12. Operator seat 74 may be provided with controls configured to control at least most operations of work machine 10. Console 76 may be located adjacent front portion 56 in the interior space and may be configured to provide an operator with information and/or controls for the operation of work machine 10.

Vehicle cab 12 may further include a heating, ventilating, and air conditioning (HVAC) system 78 configured to maintain a comfortable environment in the interior space of vehicle cab 12. Compressors and/or fans operably associated with HVAC system 78 may be located in a housing 80 operably coupled to vehicle cab 12. Housing 80 may include a bottom portion (see, e.g., FIG. 5) that is angled upwardly as it extends away from rear window 64. For example, HVAC system 78 may be mounted on an upper rear portion of vehicle cab 12 and may be configured to operate via electric energy supplied by work machine 10. Such a location of HVAC system 78 may act to conserve space room in the interior space and/or may act to substantially prevent an operator's view from vehicle cab 12 from being partially obstructed.

Figure 3:
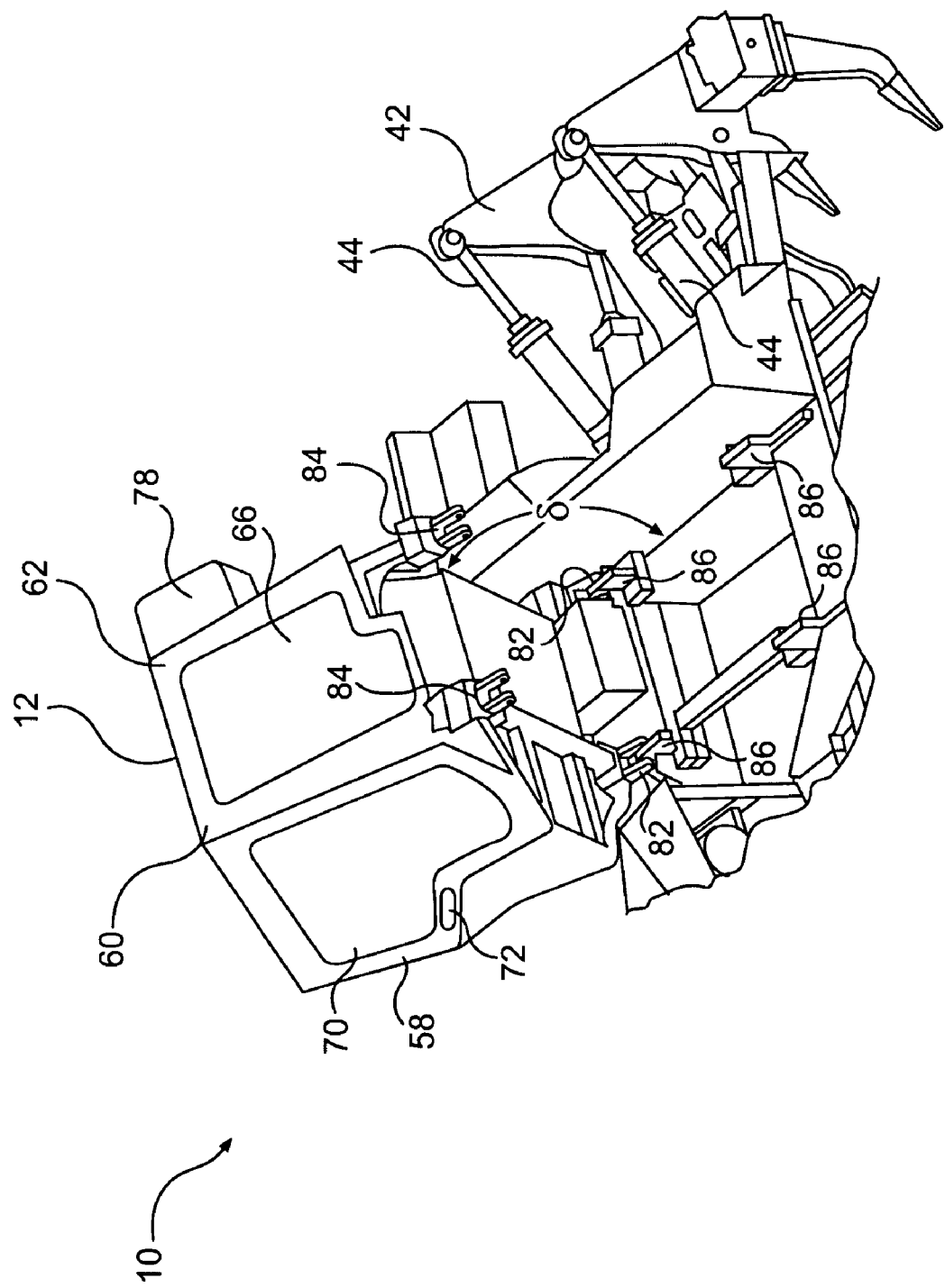
FIG. 3 is a diagrammatic perspective view of an exemplary embodiment of a vehicle cab in an orientation allowing access to other vehicle components.

Referring to the exemplary embodiments depicted in FIG. 3, vehicle cab 12 may be configured to provide access to other components or systems of a vehicle. For example, vehicle cab 12 may be configured to pivot with respect to other portions of work machine 10, thereby permitting access to various component systems within work machine 10. For example, vehicle cab 12 may be configured to pivot through an angle $\delta$ with respect to horizontal ranging from about 45 degrees to about 90 degrees (e.g., about 70 degrees). For example, vehicle cab 12 may be configured to pivot along a line substantially parallel to longitudinal axis X' of vehicle cab 12. In addition, vehicle cab 12 may be configured to pivot an intermediate amount such as, for example, to an angle $\delta$ with respect to horizontal ranging from about 10 degrees to about 30 degrees (e.g., about 20 degrees). By virtue of pivoting an intermediate amount, it may be possible to perform a quick visual inspection or conduct minor troubleshooting of various vehicle components and/or systems.

Vehicle cab 12 may be provided with cab mounts including, for example, a pair of pivoting cab mounts 82 and a pair of connecting cab mounts 84. Work machine 10 may be provided with frame mounts 86, and pivoting cab mounts 82 may be configured to pivot with respect to frame mounts 86. Connecting cab mounts 84 may be configured to be removably connected to frame mounts 86.

INDUSTRIAL APPLICABILITY

The disclosed vehicle cab may be applicable to any type of vehicle. For example, it may be applicable to a work machine such as, for example, work machine 10 or any other work machine known in the art where increased operator visibility, operator comfort, operator protection, and/or ease of access to other vehicle components, among other things, may be desired. By virtue of providing a vehicle with exemplary vehicle cab 12, one or more of these desired aspects may be achieved. The operation of exemplary vehicle cab 12 will now be explained.

A vehicle such as, for example, work machine 10 may include an exemplary embodiment of a vehicle cab 12. As shown, work machine 10 is a bulldozer, which may be used for, among other things, grading uneven terrain and/or spreading earth and/or rock. During such uses, it may be desirable for the operator to be able to easily see the extent of work machine 10, including the extent of work machine 10's work implement 30, for example, in order to grade the terrain as desired. By virtue of exemplary vehicle cab 12, an operator of work machine 10 may be provided with an improved view of the extent of work machine 10 and work implement 30.

For example, exemplary vehicle cab 12 includes an "A post" 58 extending between an upper end of front portion 56 and front center corner 50 of roof 48. "A post" 58 may be located substantially in alignment with centrally-located longitudinal axis X' of vehicle cab 12. One or more of lift cylinder 38, exhaust stack 20, and power source pre-cleaner 22 may also be substantially in alignment with centrally-located, longitudinal axis X of work machine 10, for example, such that, as viewed by the operator from a viewing position O (see FIG. 1), lift cylinder 38, exhaust stack 20, and/or power source pre-cleaner 22 are substantially hidden from view. As a result, lift cylinder 38, exhaust stack 20, and/or power source pre-cleaner 22, which may partially obstruct an operator's view in a conventional vehicle cab, are positioned such that they do not substantially obstruct the operator's view out of exemplary vehicle cab 12, for example, as depicted in FIG. 4. Furthermore, by virtue of doors 68, which include windows 70 that extend substantially down to vehicle cab 12's floor 46, an operator may have a substantially unobstructed view of lower, outer portions 32 of work implement 30, as schematically depicted in FIGS. 1 and 4. In addition, power source cover 18 may taper as it extends rearwardly toward front portion 56 of vehicle cab 12, and the visibility out of vehicle cab 12 may be less obstructed than in conventional vehicle cabs. As a result, an operator may be able to more accurately position work implement 30 when, for example, grading terrain. This may result in, for example, fewer unintended collisions between work implement 30 and objects in a work area.

Figure 5:
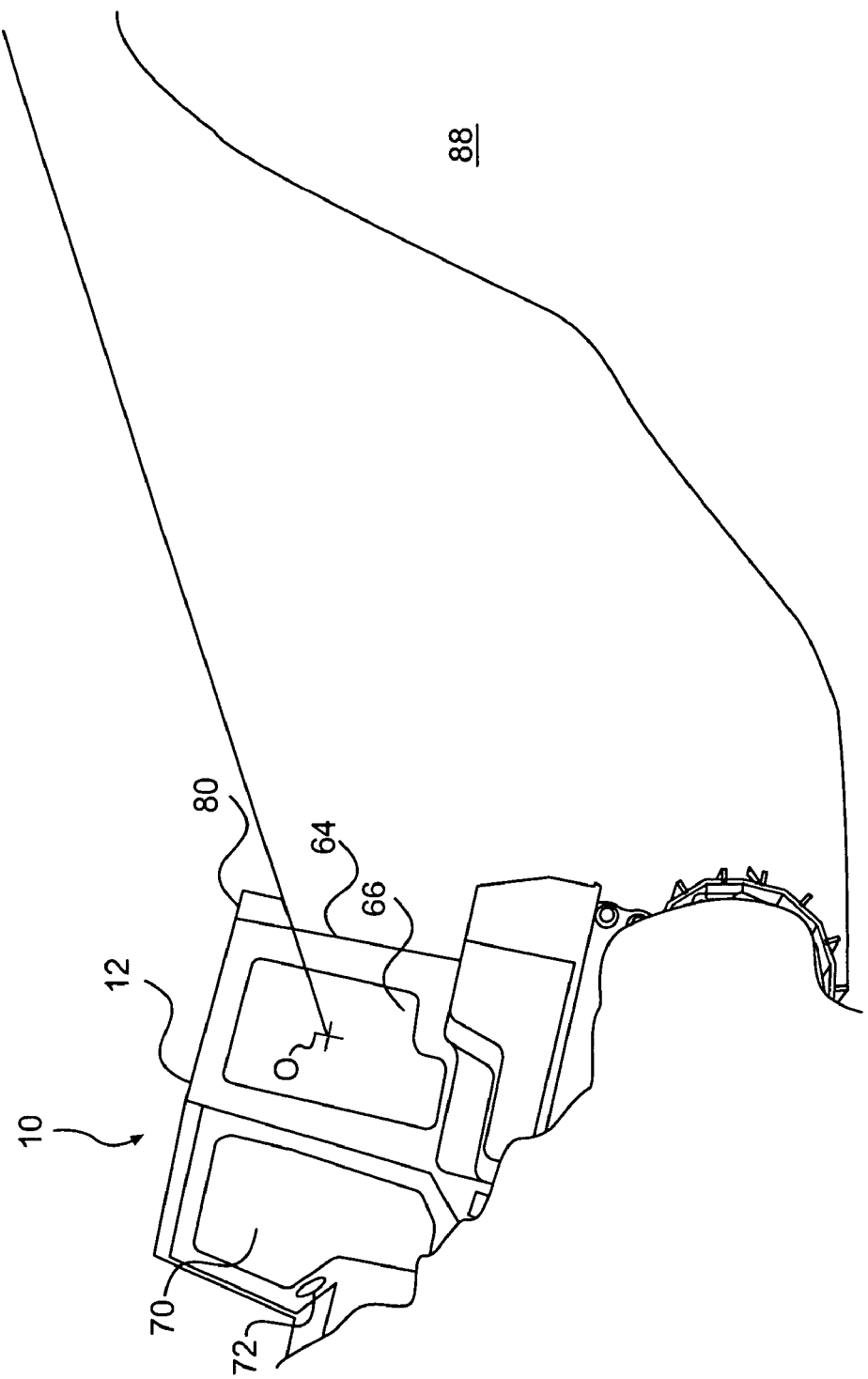
FIG. 5 is a diagrammatic side elevation view of an exemplary embodiment of a vehicle cab mounted on a vehicle.

Furthermore, by virtue of vehicle cab 12's window size, location, and/or configuration, an operator may have a substantially unobstructed view extending virtually 360 degrees around vehicle cab 12 from within its interior space, for example, as schematically depicted in FIG. 1. In addition, by virtue of operator seat 74 being configured to rotate through 360 degrees, an operator may take advantage of the 360 degree extent of visibility from the interior space of vehicle cab 12 (see, e.g., FIG. 1). Furthermore, as shown in FIG. 5, the bottom portion of HVAC housing 80 may be angled such that an operator may be provided with an expanded vertical view from viewing position O, through rear window 64 of the terrain 88.

For vehicles types that are subjected to increased wear due, for example, to operating in a harsh environment and/or due to operating for many hours on a daily basis, it may be desirable to inspect and/or service various components of the vehicle on a relatively frequent basis. For example, for a vehicle such as work machine 10, it may be desirable to inspect and/or service components located underneath or in the vicinity of vehicle cab 12, such as, for example, power source 16, drivetrain components, hydraulic components, electrical components, and/or cooling system components.

Exemplary vehicle cab 12 includes a pair of pivoting cab mounts 82 and a pair of connecting cab mounts 84, and work machine 10 includes frame mounts 86 and pivoting cab mounts 82, such that vehicle cab 12 is configured to pivot with respect to frame mounts 86 when connecting cab mounts 84 are disconnected from frame mounts 86. By virtue of exemplary vehicle cab 12 being configured to pivot (e.g., as shown in FIG. 3), inspection and service of components located underneath or in the vicinity of vehicle cab 12 may be rendered more feasible.

It may also be desirable to protect a vehicle operator from incidents, including collisions and/or vehicle roll-over. For example, a vehicle such as work machine 10 may experience an incident in which a tree or rocks fall onto vehicle cab 12, or in which work machine 10 rolls over onto its side or roof 48. Exemplary vehicle cab 12 includes "A post" 58, "B posts" 60, and "C posts" 62, one or more of which may include integrated reinforcement in order to provide protection for an operator if such incidents occur.

It will be apparent to those skilled in the art that various modifications and variations can be made to the exemplary embodiments disclosed. Other embodiments will be apparent to those skilled in the art from consideration of the specification and practice of the disclosed embodiments. It is intended that the specification and examples be considered as exemplary only, with a true scope being indicated by the following claims and their equivalents.

What is claimed is:

1. A vehicle cab comprising:
   a floor;
   a roof;
   a front support operably coupling the floor and the roof;
   at least two side supports operably coupling the floor and the roof; and
   a door operably coupled to one of the at least two side supports, the door extending from adjacent the floor toward the roof and being configured to move between an open position and a closed position in which the door is operably coupled adjacent the front support,
   wherein the door includes a window extending in a substantially uninterrupted manner from a lower edge of the door toward an upper edge of the door, and
   wherein the front support is located along a centrally-located, longitudinal axis of the vehicle cab, such that when the door is in the closed position, the door extends along a line oriented at an angle oblique with respect the longitudinal axis of the vehicle cab between the front support and the side support.

2. The vehicle cab of claim 1, wherein the angle ranges from about 30 degrees to about 60 degrees.

3. The vehicle cab of claim 1, wherein the angle is about 45 degrees with respect to the longitudinal axis of the vehicle cab.

4. The vehicle cab of claim 1, further including a second door operably coupled to another of the at least two side supports, the second door extending from adjacent the floor toward the roof and being configured to move between an open position and a closed position in which the second door is operably coupled adjacent the front support, wherein the second door includes a window extending in a substantially uninterrupted manner from a lower edge of the door toward an upper edge of the door.

5. The vehicle cab of claim 4, wherein, when the door and the second door are in the closed position, the door and the second door extend with respect to one another at an angle ranging from about 60 degrees to about 120 degrees.

6. The vehicle cab of claim 1, wherein the vehicle cab is configured to pivot along a line substantially parallel to the longitudinal axis of the vehicle cab.

7. The vehicle cab of claim 1, wherein the at least two side supports include integrated reinforcement.

8. The vehicle cab of claim 1, wherein the at least two side supports include four side supports, and the front support and the four side supports form a pentagonal arrangement.

9. A machine comprising:
   a frame defining a longitudinal axis;
   a power source operably coupled to the frame, the power source being configured to supply power to the machine;
   a pair of ground engaging members operably coupled to the frame, the ground engaging members being configured to propel the machine via power supplied by the power source;
   a vehicle cab operably coupled to the machine, the vehicle cab including
      a floor;
      a roof;
      a front support operably coupling the floor and the roof;
      at least two side supports operably coupling the floor and the roof; and
      a door operably coupled to one of the at least two side supports, the door extending from adjacent the floor toward the roof and being configured to move between an open position and a closed position in which the door is operably coupled adjacent the front support,
      wherein the door includes a window extending in a substantially uninterrupted manner from a lower edge of the door toward an upper edge of the door, and
      wherein the front support is located along a centrally-located, longitudinal axis of the vehicle cab, such that when the door is in the closed position, the door extends along a line oriented at an angle oblique with respect the longitudinal axis of the vehicle cab between the front support and the side support.

10. The machine of claim 9, wherein the longitudinal axis of the machine and the longitudinal axis of the vehicle cab lie in the same vertical plane.

11. The machine of claim 10, wherein the longitudinal axis of the machine is centrally located with respect to the machine.

12. The machine of claim 9, further including an actuator operably coupled to the machine, the actuator being configured to move a work implement operably associated with the machine, wherein the actuator is aligned with the longitudinal axis of the vehicle cab.

13. The machine of claim 9, further including an exhaust stack operably coupled to the power source, wherein the exhaust stack is aligned with the longitudinal axis of the vehicle cab.

14. The machine of claim 9, further including a pre-cleaner operably coupled to the power source, wherein the pre-cleaner is aligned with the longitudinal axis of the vehicle cab.

15. The machine of claim 9, further including a work implement operably coupled to the machine, the work implement defining a length extending substantially transverse with respect to the longitudinal axis of the machine and two outer ends, wherein the vehicle cab is configured such that an operator located within the vehicle cab can see the two outer ends of the implement.

16. The machine of claim 9, wherein the angle oblique with respect the longitudinal axis of the vehicle cab ranges from about 30 degrees to about 60 degrees.

17. The machine of claim 9, further including a second door operably coupled to another of the at least two side supports, the second door extending from adjacent the floor toward the roof and being configured to move between an open position and a closed position in which the second door is operably coupled adjacent the front support, wherein the second door includes a window extending in a substantially uninterrupted manner from a lower edge of the door toward an upper edge of the door.

18. The machine of claim 17, wherein, when the door and the second door are in the closed position, the door and the second door extend with respect to one another at an angle ranging from about 60 degrees to about 120 degrees.

19. The machine of claim 9, wherein the vehicle cab is operably coupled to the machine such that the vehicle cab pivots along a line substantially parallel to the longitudinal axis of the machine.

20. The machine of claim 9, wherein the at least two side supports include four side supports, and the front support and the four side supports form a pentagonal arrangement.

21. A method for enhancing an operator's visibility from a vehicle cab of a vehicle, the method comprising:
   providing a vehicle cab including a front support and two windows extending obliquely from adjacent the front support toward a rear end of the vehicle;
   aligning the front support of the vehicle cab with a centrally-located, longitudinal axis of the vehicle cab and at least one of an actuator, an exhaust stack, and a pre-cleaner operably coupled to the vehicle; and
   positioning an operator's seat within the vehicle cab such that when the operator of the vehicle is in the operator's seat, the operator can view a lateral extent of a front portion of the vehicle adjacent the ground.

22. A machine comprising:
   a frame defining a centrally-located longitudinal axis;
   a power source operably coupled to the frame, the power source being configured to supply power to the machine;
   a pair of ground engaging members operably coupled to the frame, the ground engaging members being configured to propel the machine via power supplied by the power source;
   a vehicle cab operably coupled to the machine, the vehicle cab including a floor;

a roof;

a front support operably coupling the floor and the roof;

at least two side supports operably coupling the floor and the roof; and two doors, each of the two doors being operably coupled to respective ones of the at least two side supports, each of the two doors extending from adjacent the floor toward the roof and being configured to move between an open position and a closed position in which the door is operably coupled adjacent the front support, wherein each of the two doors includes a window extending in a substantially uninterrupted manner from a lower edge of the door toward an upper edge of the door, and wherein the front support is located along the centrally-located, longitudinal axis of the machine, such that when each of the doors is in the closed position, the doors extend along a line oriented at an angle oblique with respect the centrally-located, longitudinal axis of the machine between the front support and the respective side supports.

* * * * *

UNITED STATES PATENT AND TRADEMARK OFFICE
CERTIFICATE OF CORRECTION

PATENT NO. : 7,347,488 B2  Page 1 of 1
APPLICATION NO. : 11/214904
DATED : March 25, 2008
INVENTOR(S) : Hayes et al.

It is certified that error appears in the above-identified patent and that said Letters Patent is hereby corrected as shown below:

Please correct the Claim as follows:
Column 8, line 20, in Claim 15, before "implement." insert -- work --.

Signed and Sealed this

Twenty-first Day of October, 2008

JON W. DUDAS
*Director of the United States Patent and Trademark Office*